United States Patent

Poon

[15] 3,662,714
[45] May 16, 1972

[54] STRUCTURE FOR HOUSING ANIMALS

[72] Inventor: Yull Gunn Poon, 204 Centre Street South, Calgary, Alberta, Canada

[22] Filed: Apr. 2, 1970

[21] Appl. No.: 25,221

[52] U.S. Cl. ................................................. 119/18, 119/22
[51] Int. Cl. ..................................................... A01k 01/00
[58] Field of Search ..................... 119/15, 16, 17, 18, 22, 28

[56] References Cited

UNITED STATES PATENTS

| | | | |
|---|---|---|---|
| 3,159,139 | 12/1964 | Haggard et al. | 119/17 |
| 3,463,123 | 8/1969 | Hoeltge | 119/15 |
| 3,167,052 | 1/1965 | Kuhlmann | 119/22 X |
| 529,569 | 11/1894 | Thayer et al. | 119/28 |
| 2,302,314 | 11/1942 | Haggart | 119/18 X |
| 3,002,494 | 10/1961 | Murray | 119/22 X |

Primary Examiner—Hugh R. Chamblee
Attorney—J. A. Enstone

[57] ABSTRACT

An improved structure for housing animals. The structure includes:

a. a plurality of vertically tiered rooms, each room having a slightly inclined floor and hollow walls engaging the higher and lower ends of the inclined floor, b. deflector means to direct refuse material falling from the lower end of one floor down a hollow wall to the higher end of a floor on the next lower tier, c. conveyor means to carry material across each inclined floor from the higher end to the lower end, whereby refuse material is carried sequentially from floor to floor along a continuous path from the top to the bottom of the structure, and d. conveyor means to carry feed from storage bins at the top of the structure down through the several tiers with feed outlets serving each tier.

2 Claims, 10 Drawing Figures

3,662,714

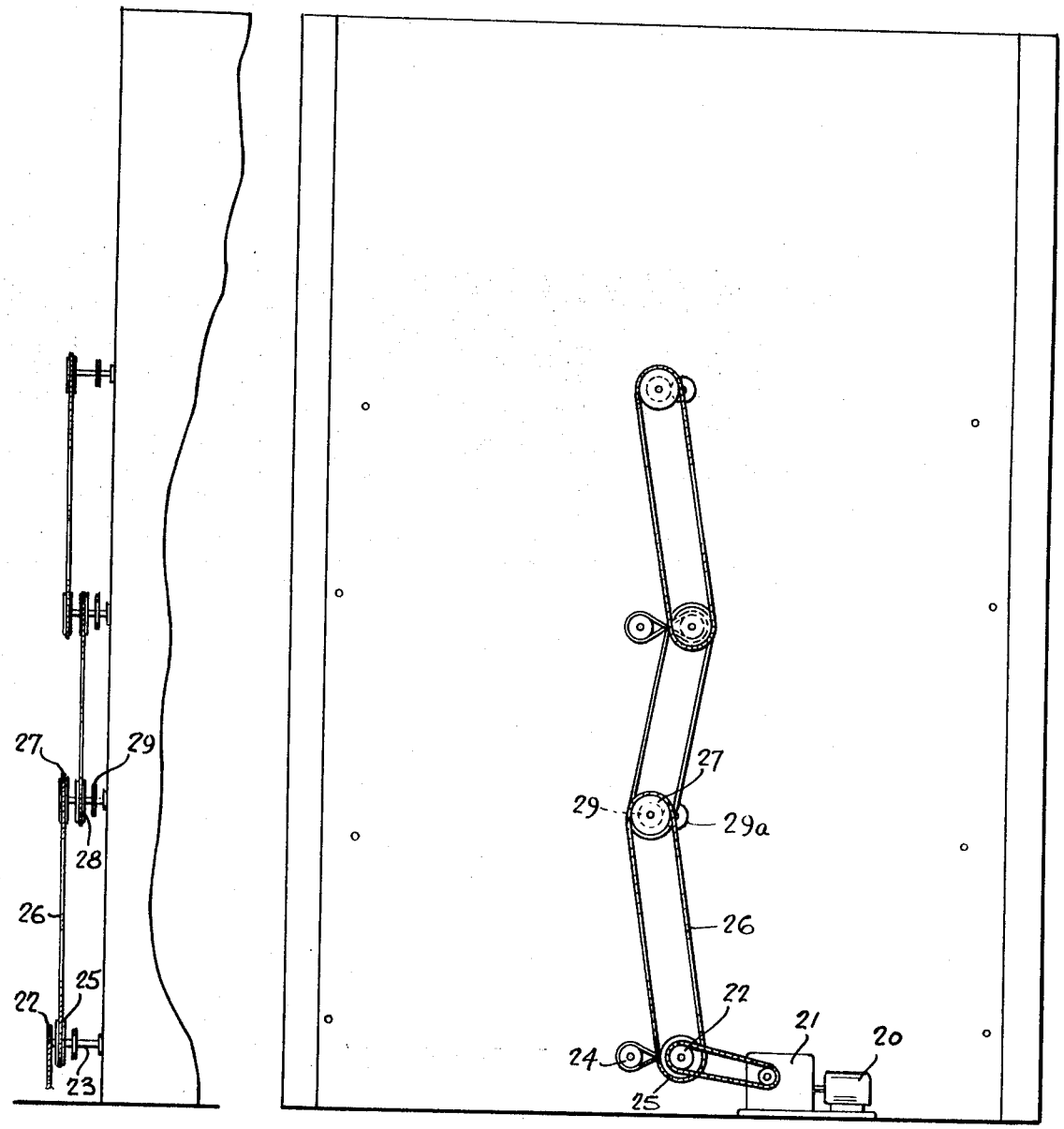

STRUCTURE FOR HOUSING ANIMALS

This invention relates to an improved structure and system for housing animals.

The maintenance of clean, sanitary conditions in a large animal barn has always presented a problem and it is readily appreciated that the disagreeable conditions which occur regarding cleanliness, odor and general sanitation, together with the present day problem of having to compete with industrial wages, have made it most difficult to obtain personnel to operate such establishments. This is particularly true in cases where the staff must manually handle and remove the animal excrements.

Much has been done in recent years to ease the burden of farm workers with the introduction of automatic water bowls, power operated gutter conveyors for removing manure and a variety of automatic feeding devices. These systems have, however, generally been based on having all the animals on a single level in the structure. Typically, forage such as hay for feeding to the animals is stored in a storage area above the level on which animals are housed.

When a large number of animals are to be housed in this manner, an extremely large structure becomes necessary with long distances being involved on the one level and very long conveyor systems, etc., being necessary to provide mechanized services.

According to my invention, I have developed a multi-level structure for housing animals in which the mechanical servicing systems can be operated over very short horizontal runs and these systems can be vertically interconnected between the different levels of the structure. The structure preferably contains a number of different pens or rooms on each level and each room has a floor with a slight incline. The floors on each level are arranged such that on one level a pair of lower edges are adjacent and on the next level a pair of higher edges are adjacent.

These floors can be constructed in a number of different ways. For example, if a room is to house dairy cows which are locked into individual stalls, a simple concrete floor can be used with the usual manure collecting gutter. A mechanized conveyor system, e.g., an endless conveyor running from floor to floor, then operates in the gutter for removal of the manure.

If the room is to house groups of animals such as pigs, calves, etc., then a composite floor structure can be used having a sub-floor of reinforced concrete with one or more conveyor belts overlaying a substantial portion of this sub-floor. These conveyor belts preferably are made from a metallic mesh. An upper false floor with openings therein, e.g., one made from expanded metal or wooden strips spaced a short distance apart, is placed above the mesh conveyor belts so that solid material will pass through the upper floor and be carried away by operation of the mesh conveyor belt, while liquid will pass through the mesh and flow along the inclined concrete sub-floor. For large structures, independently operated mesh conveyor belts are provided for each room while for smaller structures a single endless mesh conveyor belt can be used which passes from floor to floor. The upper false floors are conveniently constructed in sections so that they can be lifted and removed for repair to the system, the housing of different kinds of animals, etc.

Hollow vertical walls are provided at the ends of these rooms and the walls are arranged with vertical passageways so that the refuse (manure, liquids, etc.) carried off one floor drops down a passageway in the wall to the next lower level. Thus, the refuse passes from the lower end of one floor to the higher end of the floor at the next lower level.

The purpose of the inclined floors together with the interconnecting end passageways is to permit the refuse removal operation to be combined with a flushing operation. Thus the conveyors in all of the levels of a given vertical series of floors can be set in motion and a flow of wash water can be introduced at the top of the structure. This wash water will then sequentially flow across each floor and down each passageway, finally reaching the bottom of the entire structure. In this way a very efficient cleaning of the structure can be achieved and detergents, bactericides, etc., can be introduced into this wash water, thus both cleansing and purifying the entire structure.

Depending on the number of levels to be provided in the structure, access to the different levels can be either by means of an elevator or by means of external ramps.

It will be appreciated that a structure of this type can be in the form of a large building housing large animals, such as cows, or it can be in the form of a rather small structure which can be placed inside an existing room and used for raising small fur bearing animals such as rabbits, mink, chinchillas, etc.

The structure of my invention can also include an automated feeding system for feeding animals in each of the vertically tiered rooms. This feeding system is conveniently arranged in a manner rather similar to the refuse removal system with a series of feed carrying conduits extending across the ceiling of each room and connected to vertical passageways in the hollow end walls. These can be conveniently arranged so that the passageways between levels occur in the end wall opposite to the end wall containing the passageway for the refuse. For carrying the feed through this system an endless chain-type of conveyor can be installed into the ducts. Feed outlets are provided in the ducts crossing each room so that when these outlets are opened and the conveyor is in operation the feed falls from the outlets into mangers or troughs positioned below.

The invention is illustrated by the attached drawings in which:

FIG. 7 is a side elevation showing a drive system for the conveyors;

FIG. 8 is an end elevation of the drive system of FIG. 7;

Figure 1:
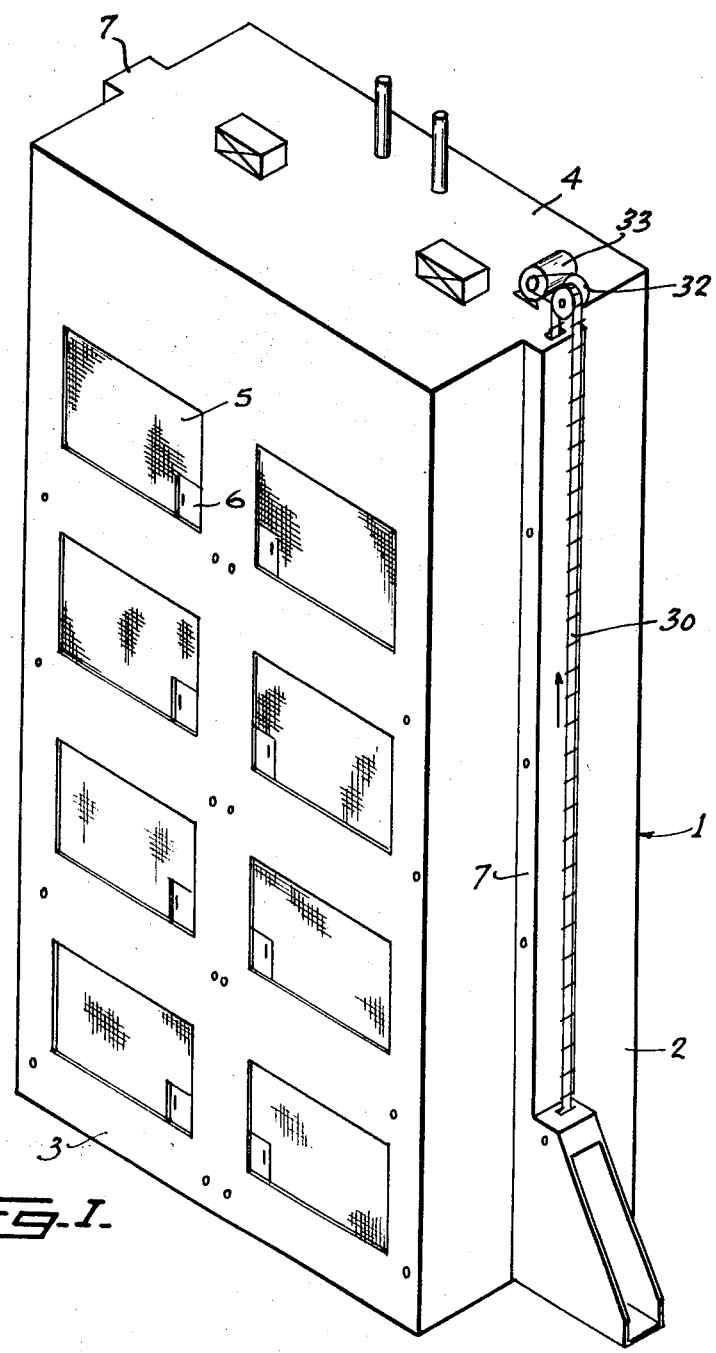
FIG. 1 is a pictorial view of a typical structure according to the invention.

As shown in FIG. 1, the structure 1 has end walls 2, side walls 3 and a top 4. The side walls 3 can be provided with glass or screen sections 5 and doorways 6. If the structure 1 is a small one to be used for housing small animals, these can be placed into the compartments through the doorways 6 by hand, while if the structure is in the form of a large building to house large animals, an elevator shaft or ramps can be provided to the doorways.

Ducts 7 are shown on the end walls 2 and these ducts are for the purpose of supplying feed to the animals as discussed hereinafter.

Figure 2:
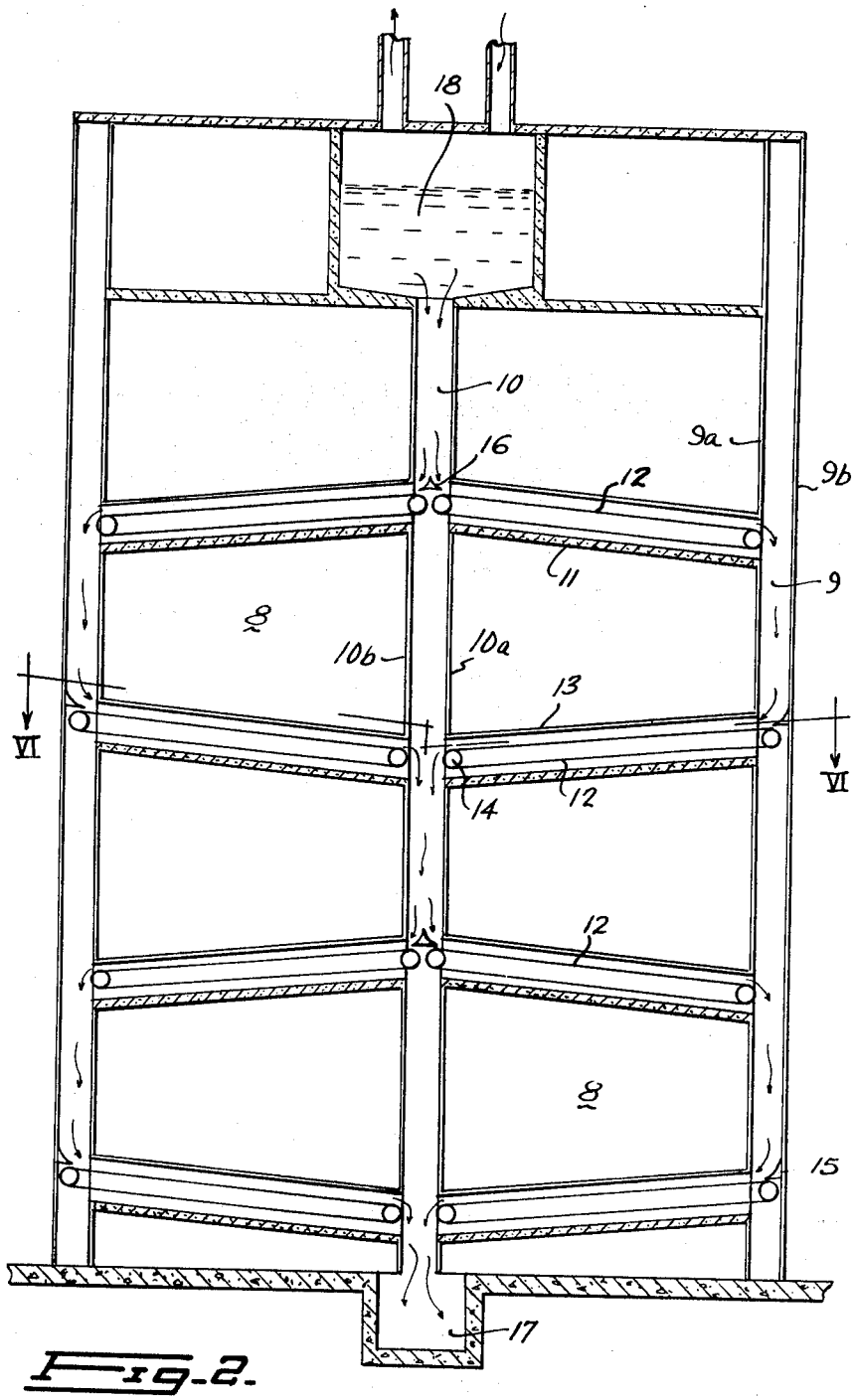
FIG. 2 is a sectional view of the structure showing a conveyor system for removing refuse.

The main features of the structure are shown in FIG. 2 from which it will be seen that a series of individual rooms or pens 8 are formed between outer hollow end walls 9 and hollow partition walls 10. These pens 8 are provided with inclined floors consisting of a solid concrete slab sub-floor 11 completely sealing the room except for openings into the hollow walls, an endless belt conveyor 12 mounted on rollers 14 above the sub-floor 11 and a false floor 13 positioned above the conveyor 12. Each inclined sub-floor is arranged such that the higher end thereof extends to the opposite side of the double wall and is sealed against the passage of liquid. Flow directing guides 15 are provided in the outer hollow walls 9 to direct material falling down the wall onto the next lower conveyor belt and flow directing guides 16 are also provided in the inner hollow wall 10 for the same purpose.

This means that commencing at the top of the structure in central hollow wall 10, there is a continuous passageway down hollow wall 10, along conveyor 12, down the outer hollow wall 9, along the next conveyor, down the inner hollow wall once again, etc., sequentially to the bottom of the structure where the material is finally received in the refuse bunker 17 from which it can be removed. A water storage tank 18 is provided at the top of the structure and this is connected by a valve (not shown) to central hollow wall 10 and this liquid can be used for flushing the floors.

Figure 6:
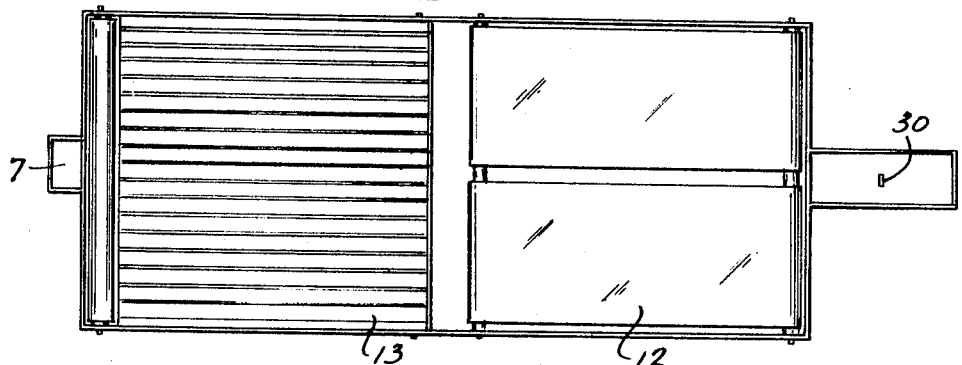
FIG. 6 is a sectional view along line 6—6 of FIG. 2.
Figure 9:
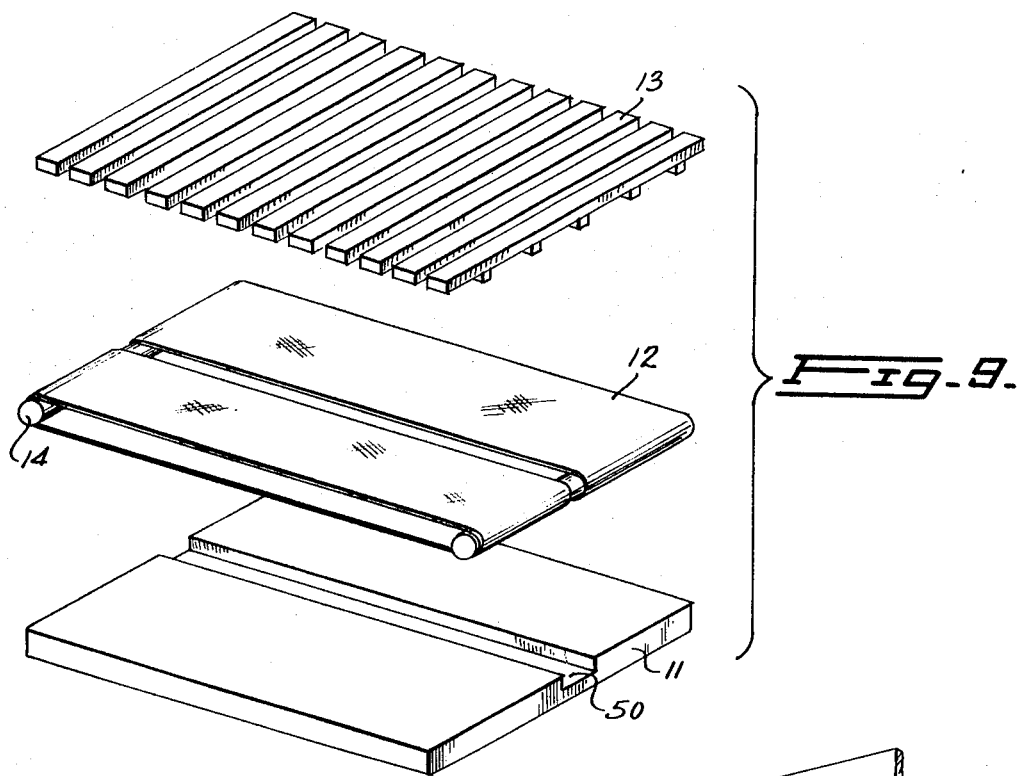
FIG. 9 is an exploded view of a floor structure.

The construction of the floor units is shown in greater detail in FIGS. 6 and 9. The conveyor belts 12 can be in the form of rubber or woven fabric belts or preferably they can be in the form of a metal mesh. The false floor 13 positioned above the conveyor 12 can be made from longitudinal strips of wood with spaces therebetween or from heavy expanded metal. The openings in the floor 13 must be sufficiently small to permit the animals to walk without difficulty while permitting refuse material to pass through and land on the conveyor 12. In FIGS. 6 and 9 the conveyor 12 is shown in two sections and this permits central supports for the false floor 13 if these are found to be necessary for a large floor area. The false floor 13 can be swung up out of operational position for maintenance or cleaning of the conveyor and it can also be made in a number of sections to facilitate handling.

A gutter 50 is shown in the concrete sub-floor 11 in FIG. 9 and this gutter can be used without the conveyor 12 and false floor 13 positioned above. In place of these, a small conveyor can be placed directly into the gutter 50 and used in the usual manner, e.g., for housing dairy cows. When the gutter is being utilized, it also has been found that the entire system can be simplified by replacing the separate conveyor for each floor by a single endless conveyor which follows the sequential flow path from floor to floor through the entire system.

The walls of the structure can be constructed from a variety of material and the side walls 3 can, for example, be made of regular concrete blocks. The outer section 9b of hollow wall 9 can also be made conveniently from concrete blocks while the inner section 9a of this wall is preferably made from a lighter material, e.g., corrugated metal, so that sections of this wall can be removed for easy cleaning or maintenance in the hollow wall 9. The sides 10a and 10b of central partition wall 10 are also preferably made from a light material such as corrugated metal again, to permit movability and easy access to the interior of the wall.

The conveyors 12 can be driven by independent electric motors operatively connected to the individual conveyors or a drive system powered by a single heavy motor can be used as shown in FIGS. 7 and 8. In this arrangement a motor 20 drives a reduction gear box 21 which is connected to a main drive pulley 22. This pulley 22 is mounted on the axle 23 of a conveyor roller and drives the roller. A second pulley on this axle 23 is connected by way of a belt to a pulley 24 which is mounted on the axle of a drive roller of an adjacent conveyor. Another pulley 25 on axle 23 drives the belt 26 which is connected to the main drive pulley 27 at the next higher floor and this is mounted on the axle 28 of a conveyor roller. A gear wheel 29 also is mounted on axle 28 and engages a gear wheel 29a mounted on the axle of a drive roller of an adjacent conveyor. These are repeated for as many different levels as may be in the structure.

Figure 3:
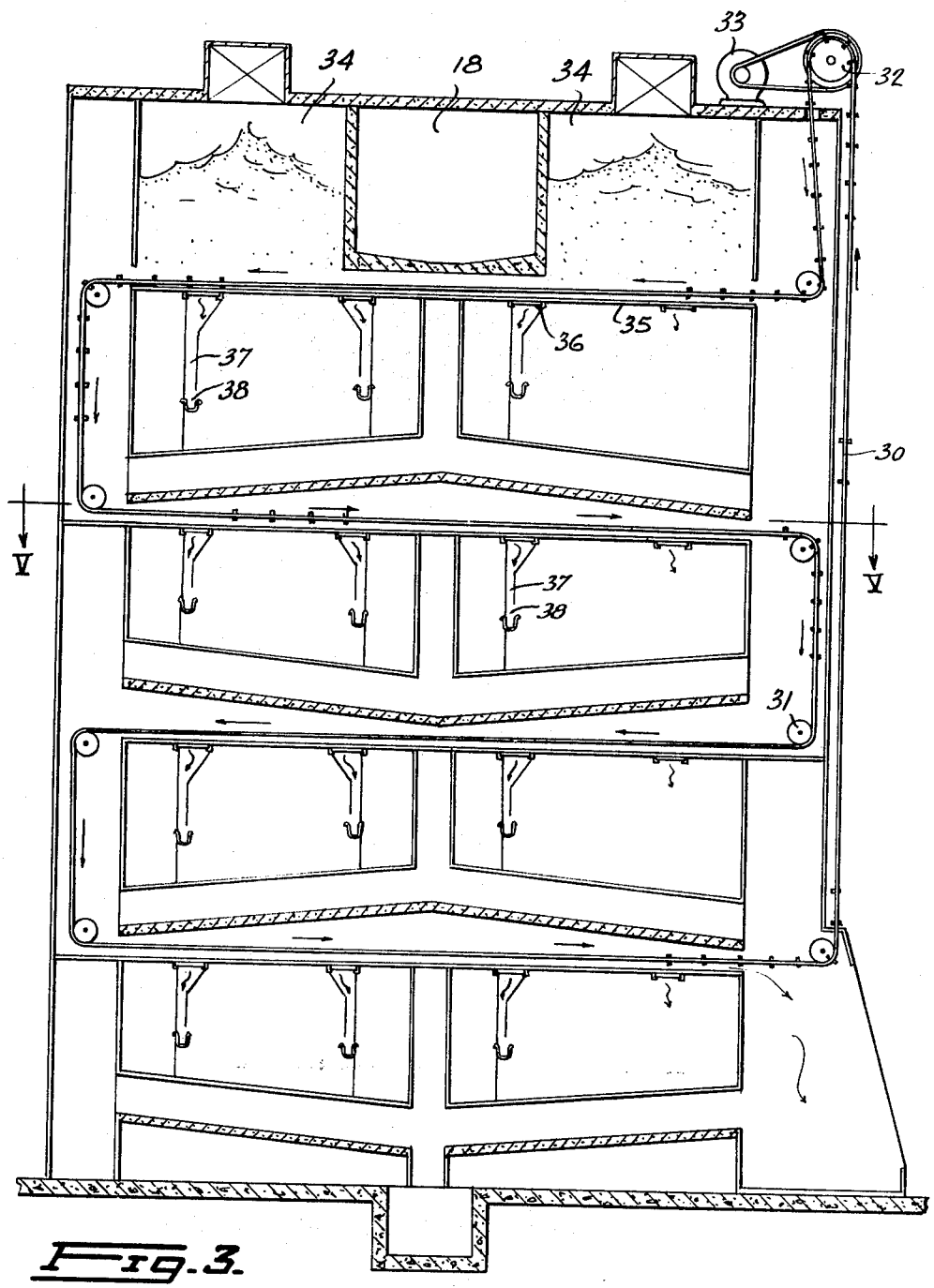
FIG. 3 is a sectional view of the structure showing a feeding device.
Figure 4:
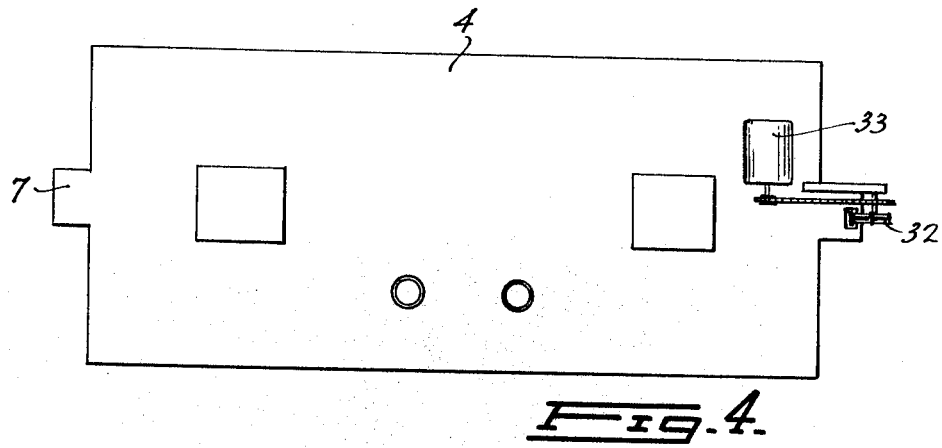
FIG. 4 is a top plan view of the structure.
Figure 5:
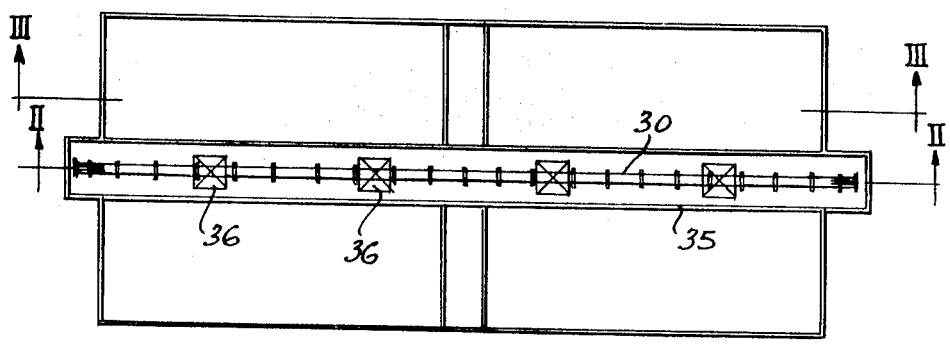
FIG. 5 is a sectional view along line 5—5 of FIG. 3.
Figure 10:
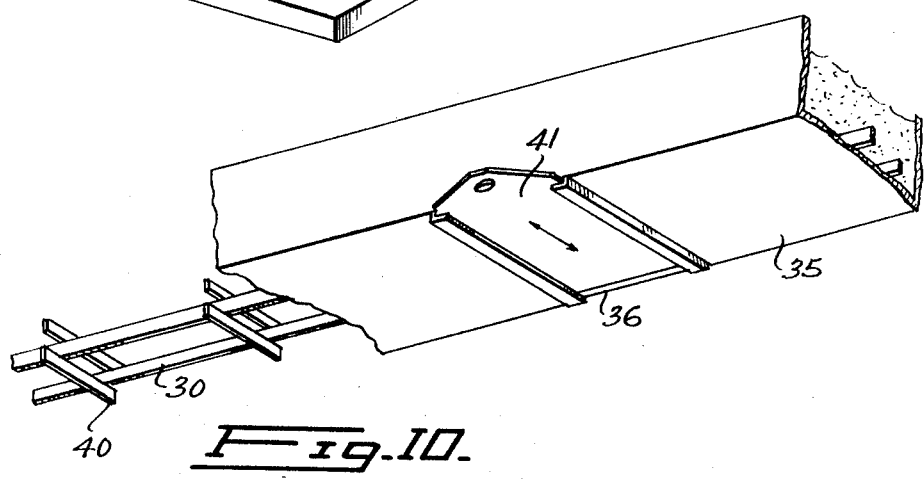
FIG. 10 is a fragmentary view showing a feed conduit with outlets.

A feed system for a vertically arranged series of rooms or pens is shown in detail in FIGS. 3, 5 and 10. From FIG. 1 it will be seen that the main conduits 7 for the feed system are mounted on the end walls 2 of the structure and these carry an endless conveyor belt 30 travelling on guide wheels 31. The conveyor is driven by drive pulley 32 which is powered by motor 33. Feed hoppers 34 are positioned at the top of the structure and these feed into horizontal conduits 35 in which the feed is pulled along by the conveyor 30 and dropped through outlets 36 into troughs or mangers in the pens 8. The remaining flow of feed continues along duct 35 down the vertical duct 7 to the next horizontal duct 35 and thus to the bottom of the structure. The return run of the endless conveyor goes from the bottom of the structure to the top as can be seen from FIG. 1.

Additional details of the conduit and conveyor are shown in FIG. 10 and it will be seen that the conveyor 30 has transverse pieces 40 which drag the feed material along the duct 35. Each feed outlet 36 is also provided with a sliding door 41 which can be adjusted depending on the amount of feed which is desired to be released into a particular pen.

It will be appreciated of course that many different arrangements are possible within the scope of this invention. Thus the number of rooms or pens per floor can be varied as desired and the number of floors is also variable depending on individual requirements.

Interconnecting doors can be provided between rooms or pens and internal hallways, elevator shafts, heaters, etc., can be installed depending on climatic conditions that are encountered. The usual drinking water systems and ventilating fans can be provided as required.

What I claim is:

1. An improved structure for housing animals comprising:
   a. a plurality of vertically tiered rooms, each said room having a slightly inclined concrete slab floor and hollow walls engaging the higher and lower ends of the inclined concrete floor,
   b. a foraminous floor spaced above each concrete floor,
   c. an endless belt conveyor means mounted for movement on the concrete slab in the direction of its lower end to carry refuse passing through the foraminous floor into the hollow wall adjacent the lower end of the concrete slab,
   d. deflector means for directing the refuse material falling from the lower end of one concrete slab floor down a hollow wall to the higher end of a concrete slab floor on the next lower tier, and
   e. flushing water supply means for supplying water to a said hollow wall at the top of the structure, whereby refuse material and flushing water are carried from floor to floor along a continuous path from the top to the bottom of the structure.

2. An improved structure for housing animals comprising:
   a. a plurality of vertically tiered rooms, each room having a slightly inclined concrete slab floor and hollow walls engaging the higher and lower ends of the inclined concrete floor,
   b. a foraminous floor spaced above each concrete floor,
   c. an endless belt conveyor means mounted for movement on the concrete slab in the direction of its lower end to carry refuse passing through the foraminous floor into the hollow wall adjacent the lower end of the concrete slab,
   d. deflector means for directing the refuse material falling from the lower end of one concrete slab floor down a hollow wall to the higher end of a concrete slab floor on the next lower tier,
   e. flushing water supply means for supplying water to a said hollow wall at the top of the structure, whereby refuse material and flushing water are carried from floor to floor along a continuous path from the top to the bottom of the structure,
   f. a feeding system comprising feed bins at the top of the structure, horizontal feed ducts with outlets extending across each room ceiling, interconnecting vertical ducts on the outer walls of the structure and an endless conveyor belt for pulling feed through the ducts, and
   g. troughs positioned beneath the said outlets in each room to receive feed.

* * * * *